Dec. 7, 1965     C. W. CLARK, JR     3,221,513
FREEZING CYLINDER
Filed March 18, 1963     2 Sheets-Sheet 1
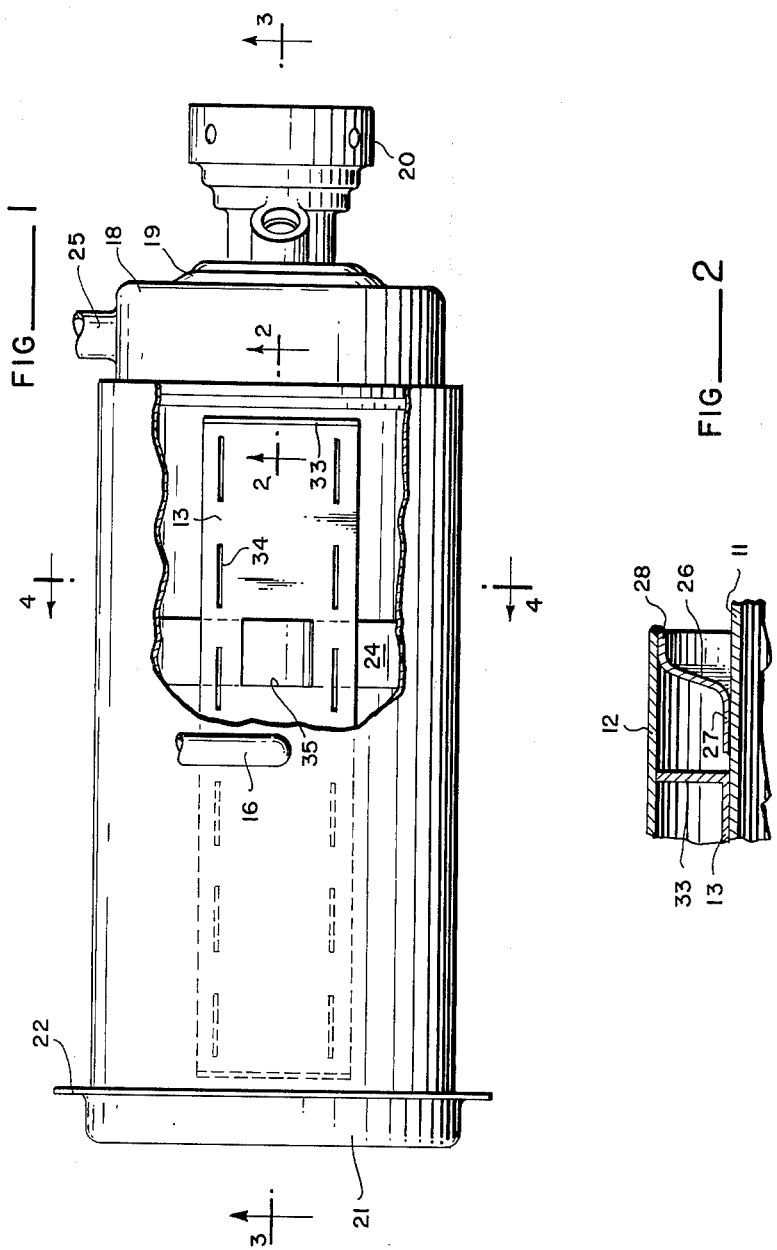
CHARLES WILLIAM CLARK JR.
*INVENTOR.*
BY *Seed & Berry*
ATTORNEYS Dec. 7, 1965   C. W. CLARK, JR   3,221,513
FREEZING CYLINDER
Filed March 18, 1963   2 Sheets-Sheet 2
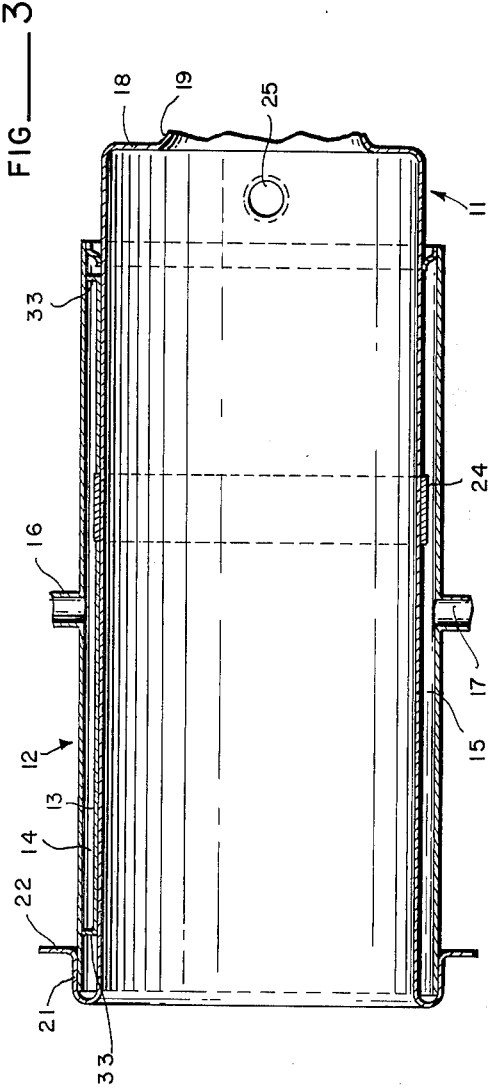
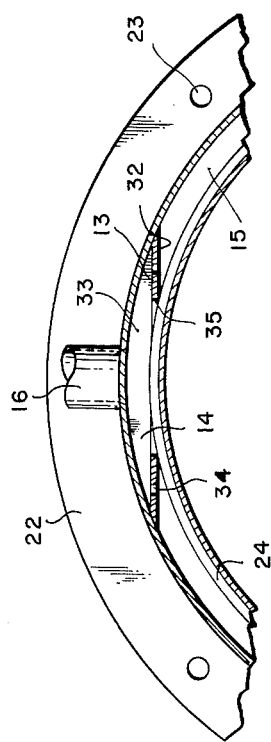
CHARLES WILLIAM CLARK JR.
INVENTOR.
BY *Seed & Berry*
ATTORNEYS

United States Patent Office

3,221,513
Patented Dec. 7, 1965

3,221,513
FREEZING CYLINDER
Charles William Clark, Jr., Edmonds, Wash., assignor to Sweden Freezer Manufacturing Co., a corporation of Washington
Filed Mar. 18, 1963, Ser. No. 265,945
3 Claims. (Cl. 62—519)

This invention relates to a dispensing freezer for ice cream and the like, and more particularly to an improved freezing cylinder for a dispensing freezer such as that shown in United States Patent No. 2,924,952, issued February 16, 1960, and to a process for making the same.

Freezing cylinders of this type generally comprise inner and outer cylindrical shells which form a jacket through which a refrigerant is circulated to cool the mix for the frozen product within the cylinder. The mix is fed into the cylinder at the rear thereof, and after being frozen therein and whipped to proper consistency with the desired overrun by a dasher, the frozen mix is dispensed through a front gate in individual servings.

In fabricating such cylinders, stainless steel has proven to be a very desirable material because of its resistance to corrosion and wear, tensile strength, etc. However, since stainless steel is a relatively poor conductor of heat, it is desirable to make the inner shell thin so that there will be proper heat transfer between the mix and the refrigerant.

The dasher not only whips the mix but also scrapes the wall of the inner shell, thus requiring that this inner shell be formed to close tolerance which must be maintained during operation of the freezer. Furthermore, the refrigerant in the jacket is under a relatively high pressure which makes it necessary that the band between the two shells be perfect to confine the refrigerant. Bonding of the shells by welding, though providing sufficient strength and proper sealing characteristics, tends to distort the inner shell beyond proper tolerances, while other methods of bonding the shells have not been able to consistently and economically produce a bond of proper sealing characteristics.

Another important consideration in freezing cylinder design is that of providing proper distribution of the refrigerant in the cylinder jacket and in a manner which will best enable the two shells to be readily assembled in accordance with the above requirements of proper tolerance and sealing.

Thus the present invention aims to provide an improved freezing cylinder of the type described, which can be economically produced, which has superior refrigerant circulation and heat transfer, and in which the inner and outer shell are so joined to one another that a proper seal is formed between them without distortion of the inner shell.

These and other objects and advantages in view will appear and be understood in the course of the following description and claims, the invention consisting in the novel construction and in the adaptation and combination of parts hereinafter described and claimed.

In the accompanying drawings:

FIG. 1 is a side elevational view of a freezing cylinder embodying preferred teachings of my invention, with a portion of the outer shell thereof being broken away.

FIG. 2 is a detail longitudinal sectional view taken on line 2—2 of FIG. 1.

FIG. 3 is a fragmentary longitudinal sectional view taken on line 3—3 of FIG. 1, and FIG. 4 is a fragmentary sectional view taken on line 4—4 of FIG. 1, and drawn to an enlarged scale.

Referring to the accompanying drawing, it is seen that the freezing cylinder of the present invention has inner and outer shells 11–12 which are preferably made of stainless steel. The shells are formed as concentric cylinders, defining therebetween an annular refrigerant inclosure subdivided by a diffuser plate 13 into manifold and expansion chambers 14–15. The inlet and outlet 16–17 for these chambers are provided at the center portion of the outer shell 12 at diametrically opposed locations thereon.

The rear of the inner shell is closed by an annular end wall 18 which is outwardly dished at 19 to provide an inside seat for a rubber sealing cup sleeved on the dasher shaft (not shown) for the freezing cylinder. An extension 20 for housing bearings for the dasher shaft is welded to the dished portion 19. The front end portion of the inner shell 11 is turned radially outwardly and folded back on itself at 21 in radially spaced relation to the main body of the shell and terminates by an outturned lip 22 having bolt holes 23 to receive anchoring bolts for securing the front of the freezing cylinder in place on the frame of the freezer. Circumscribing the inner shell 11 at the approximate mid-length thereof, is a reinforcing band 24, which is or may be sweat soldered to the shell.

It will be noted that the rear portion of the inner shell 11 has a mix feed tube 25 secured thereto for supplying mix as from a surmounting tank (not shown). A short distance forward of the tube and seated between the shells 11–12 is a connecting ring 26, also desirably made of stainless steel. The configuration of this ring along a section perpendicular to the perimeter thereof may be that of a "lazy-S" whose inner and outer flanges 27–28 are parallel to the longitudinal axis of the cylinder The inner flange 27 is brazed (desirably silver-soldered) to the inner shell 11, while the outer flange 28 is welded to the outer shell 12. It will be noted that the forward end of the outer shell 12 fits within the front portion 21 of the inner shell and is preferably welded thereto.

The diffuser plate 13 is planar and is soldered to the inner shell 11 so as to be tangent thereto along a juncture line extending the length of said inner shell. Each of the side edges 32 of the plate are beveled and reach to the inner surface of the outer shell 12, to define therewith the elongated manifold chamber 14, whose configuration in transverse section is that of a cord segment of a circle. At each end of the plate 13 is an upstanding arcuate flange 33 to close off the respective end of the manifold and two rows of through slots 34 are formed along the length of the plate 13. Thus refrigerant flowing from the inlet 16 fills the manifold chamber 14 and passes through the slots 34 so as to be properly distributed within the expansion chamber 15. A rectangular cut-out 35 is formed in the plate 13 to accommodate the reinforcing band 24.

To assemble the freezing cylinder, the ring 26 is slipped onto the rear portion of the inner shell 11, where it is silver-soldered thereto. The solder is applied along one edge of the inner flange 27 of the ring and is drawn by a proper application of heat between the flange 27 and the inner shell 11 to the opposite edge of this flange, thus insuring a proper seal between the inner shell and the ring. Since both edges of the flange 27 are exposed at this point, visual inspection is possible to insure that the solder has flowed completely through to the opposite edge of the flange.

The plate 13 is then soldered to the inner shell 11 following which the outer shell 12 is slipped over the inner shell 11 with its front end fitting within the front annular lip portion 21 and its rear end fitting over the outer flange 28 of the ring 26. Assembly is completed by welding the outer shell to the lip 21 and to the flange 28 so as to provide a proper seal for the chambers 14–15.

It has been found that by making a freezing cylinder according to the teachings of my invention, it is possible to use a very light gauge stainless steel for the inner shell 11, as for example, a thickness of .030 inch, to insure efficient heat transfer therethrough and still maintain the cylindrical shape of the inner shell within close tolerances.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

I claim:

1. A freezing cylinder for a frozen comestible dispenser comprising, inner and outer shells spaced apart radially to define a chamber therebetween, said inner shell being of thin stainless steel and turning outwardly at one of its ends and then being bonded to the respective end of the outer shell, a ring located between said inner and outer shells at the other end of said outer shell, said ring being bonded to said outer shell and brazed to the inner shell, said inner shell continuing longitudinally beyond said outer shell from said ring and then necking, and said inner shell having an egress opening for product mix between said ring and said necking, said outer shell having an inlet and outlet for refrigerant, and a perforated diffuser plate tangential to said inner shell and subdividing said chamber into a manifold chamber and an expansion chamber, said inlet feeding to said manifold chamber and said outlet leading from said expansion chamber, said inner shell being free of welds between said outward turning and said necking.

2. A freezing cylinder for a frozen comestible dispenser comprising, inner and outer shells spaced apart radially to define a chamber therebetween, said inner shell being of thin steel and having an outwardly turning portion at one of its ends which is bonded to the respective end of the outer shell, a ring located between said inner and outer shells at the other end of said outer shell, said ring being bonded to said outer shell and brazed to the inner shell, said inner shell continuing longitudinally beyond said outer shell from said ring and then necking, and said inner shell having an egress opening for product mix between said ring and said necking, said outer shell having an inlet and outlet for refrigerant, and diffuser means between said shells and subdividing said chamber into a manifold chamber and an expansion chamber, said inlet feeding to said manifold chamber and said outlet leading from said expansion chamber, said inner shell being free of welds between its said outwardly turned portion and said necking.

3. A freezing cylinder for a frozen comestible dispenser comprising, a thin steel inner shell and an outer shell spaced apart radially to define a refrigerant chamber therebetween, one of said shells turning outwardly at one of its ends and then being bonded to the respective end of the other shell, a ring located between said shells at the other end of said outer shell, said ring being bonded to the outer shell and being brazed to the inner shell, said inner shell continuing longitudinally beyond said outer shell from said ring and then necking, and said inner shell having an egress opening between said ring and said necking for product mix, and said outer shell having an inlet and an outlet for refrigerant, said inner shell being free of welds between its said turning and necking portions.

References Cited by the Examiner

UNITED STATES PATENTS

| | | | |
|---|---|---|---|
| 1,084,453 | 1/1914 | St. Vrain Le Sieur | 220—15 |
| 1,809,075 | 6/1931 | Scovel | 62—515 |
| 2,057,346 | 10/1936 | Reed | 220—15 |
| 2,080,326 | 5/1937 | Maddock | 220—15 |
| 2,086,053 | 7/1937 | Smith | 220—15 |
| 2,262,590 | 11/1941 | Phelan | 62—516 |
| 2,610,478 | 9/1952 | Lofstedt | 62—515 |
| 2,745,261 | 5/1956 | Merrill | 62—342 |
| 2,810,557 | 10/1957 | Phelan | 62—342 X |
| 2,882,694 | 4/1959 | Vander Arend et al. | 62—516 X |

ROBERT A. O'LEARY, *Primary Examiner.*

MEYER PERLIN, *Examiner.*